Nov. 1, 1960  S. R. FRANKEL ET AL  2,958,302

AUTOMATIC NEEDLE POSITIONING MECHANISM

Filed Aug. 5, 1955

INVENTORS
SAMUEL R. FRANKEL
HARRY C. HUNT
KENNETH C. HAAS
CARL M. WENRICH
BY
Lee Edelson
ATTORNEY

INVENTORS
SAMUEL R. FRANKEL
HARRY C. HUNT
KENNETH C. HAAS
CARL M. WENRICH
BY Leo Edelson
ATTORNEY.

Nov. 1, 1960    S. R. FRANKEL ET AL    2,958,302
AUTOMATIC NEEDLE POSITIONING MECHANISM
Filed Aug. 5, 1955    5 Sheets-Sheet 3

INVENTORS
SAMUEL R. FRANKEL
HARRY C. HUNT
KENNETH C. HAAS
CARL M. WENRICH
BY
ATTORNEY.

Nov. 1, 1960   S. R. FRANKEL ET AL   2,958,302
AUTOMATIC NEEDLE POSITIONING MECHANISM
Filed Aug. 5, 1955   5 Sheets-Sheet 4

INVENTORS
SAMUEL R. FRANKEL
HARRY C. HUNT
KENNETH C. HAAS
CARL M. WENRICH
BY
Leo Edelson
ATTORNEY.

INVENTORS
SAMUEL R. FRANKEL
HARRY C. HUNT
KENNETH C. HAAS
CARL M. WENRICH
By Leo Edelson
ATTORNEY

United States Patent Office 2,958,302
Patented Nov. 1, 1960

2,958,302

AUTOMATIC NEEDLE POSITIONING MECHANISM

Samuel R. Frankel, Shillington, Harry C. Hunt, Reading, Kenneth C. Haas, Mohnton, and Carl M. Wenrich, Reading, Pa., assignors to American Safety Table Company, Inc., Reading, Pa., a corporation of Pennsylvania Filed Aug. 5, 1955, Ser. No. 526,756

13 Claims. (Cl. 112—219)

This invention relates generally to intermittently operated utilities and particularly to a power transmission organization operative to terminate operation of the utility when the moving parts thereof are in a predetermined position.

A principal object of the present invention is to provide in such a power transmission organization principal means for driving the utility during normal operation and auxiliary means inoperative during normal operation but automatically operative upon termination thereof to move the parts of the utility to a predetermined position and to then terminate operation of the utility.

Another principal object of the present invention is to provide such a power transmission organization wherein the auxiliary means is comparatively quick and positive in action, affording fast positioning speed coupled with simple, quiet operation.

Still another principal object of the present invention is to provide such an organization with simple controls which can be manipulated solely by conventional movements of the foot and knee of one leg, the hands of the operator always being free for guiding the work.

And still another principal object of the present invention is to provide such a power transmission organization wherein after termination of normal operation, positioning of the parts of the utility in a predetermined manner and termination of operation of the utility, the auxiliary means is operable to move the parts of the utility as desired back and forth between said predetermined position and a different position.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims.

The present invention is explained hereinafter specifically with reference to a sewing machine for the ready made clothing industry. However, it will be understood that the invention is not limited thereto and may be used in connection with other types of utilities which present the same problems.

Figure 1:
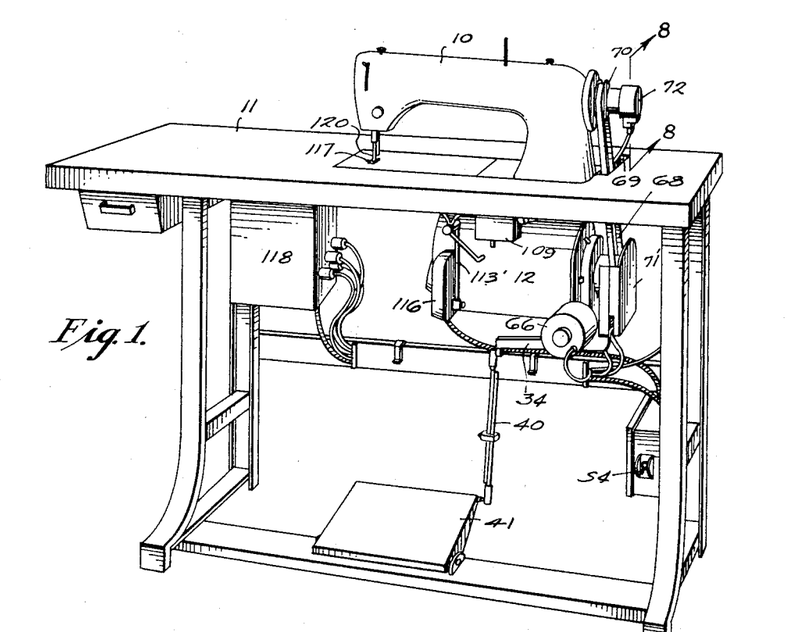
Figure 1 is a perspective view of a sewing machine of the manufacturing type constructed in accordance with and embodying the general principles of the present invention, the machine being shown at rest.

Referring particularly to Figure 1, a sewing machine 10 is mounted on a table top 11 at a convenient working height from the floor. Suspended beneath the table top 11 is an organization, designated generally by the numeral 12, for transmitting power to the sewing machine 10.

Referring particularly to Figures 2 through 6, the power transmitting organization 12 comprises a principal electric motor 13 that has a shaft 14 which is extended to receive thereon a flywheel 15, the latter being suitably keyed to the motor shaft for rotation therewith. Formed on the face of the flywheel which is remote from the motor 13 is an annular rib 16 of generally triangular shape in transverse cross section to provide it with a relatively sharp outer edge 17.

The motor 13 and its associated flywheel 15 are carried as an assembly by a supporting housing 18, within which housing the assembly is axially adjustably fixed by means not shown, except for a nut 19 threaded on a rod 20. It will be understood that when the assembly is secured within the housing in its axially adjusted position, the flywheel 15 is centered within the housing and is free to rotate therewithin.

Figure 3:
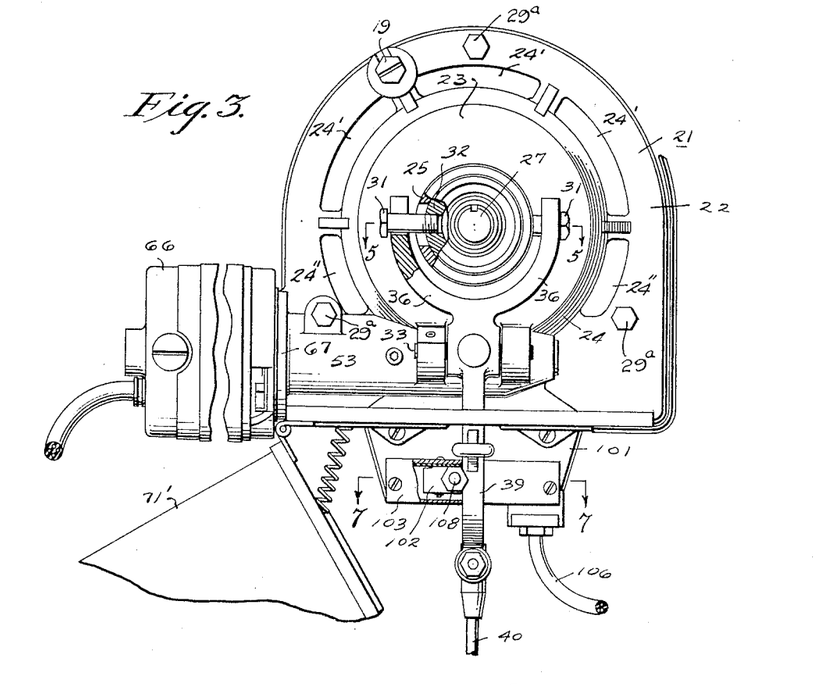
Figure 3 is an elevation at the rear end of the power transmitting mechanism shown in Figure 2.
Figure 4:
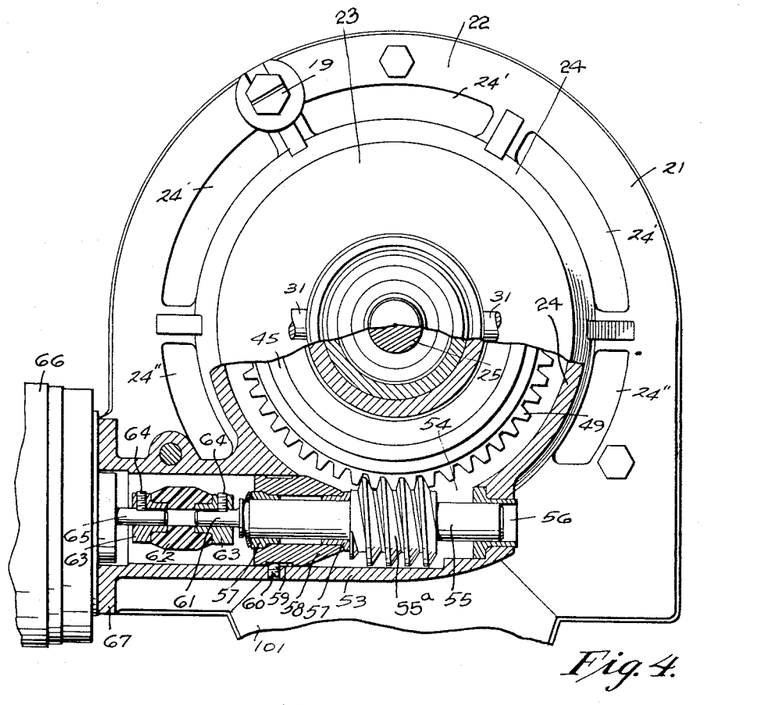
Figure 4 is a view, partly in section, taken as indicated by line 4—4 of Figure 2.

Secured to the rear of the housing 18, as by bolts 29ª shown in Figure 3, is an end member 21 having a radially extending outer wall part 22 which is joined to an annular rearwardly off-set inner wall part 23 by an annular axially extending intermediate wall part 24. The outer wall part 22 is provided with arcuate openings 24'—24' disposed adjacent to the intermediate wall part 24. Extending centrally through the inner wall part 23 of the end member 21 as an integral part thereof is a cylindrical journal box 25, and fitted within the latter is a ball-bearing assembly 26 which rotatably receives a shaft 27. Mounted respectively on opposite ends of the shaft 27 are a clutch disc 28 and a belt pulley 29, for which latter see Figure 5. The journal box or housing for the ball bearing assembly 26 is provided at diametrically opposite sides thereof with openings 30—30 through which respectively project a pair of studs 31—31 suitably secured to diametrically opposite sides of the external sleeve of the ball-bearing assembly 26, designated 32. It will be understood, of course, that the clutch disc 28 and the belt pulley 29 are each non-rotatably secured to the shaft for rotation therewith and that the clutch disc 28 and belt pulley 29, shaft 27 and ball-bearing assembly 26 are axially shiftable as a unit within the relatively stationary journal box 25 by the means presently to be described.

Figures 2, 8:
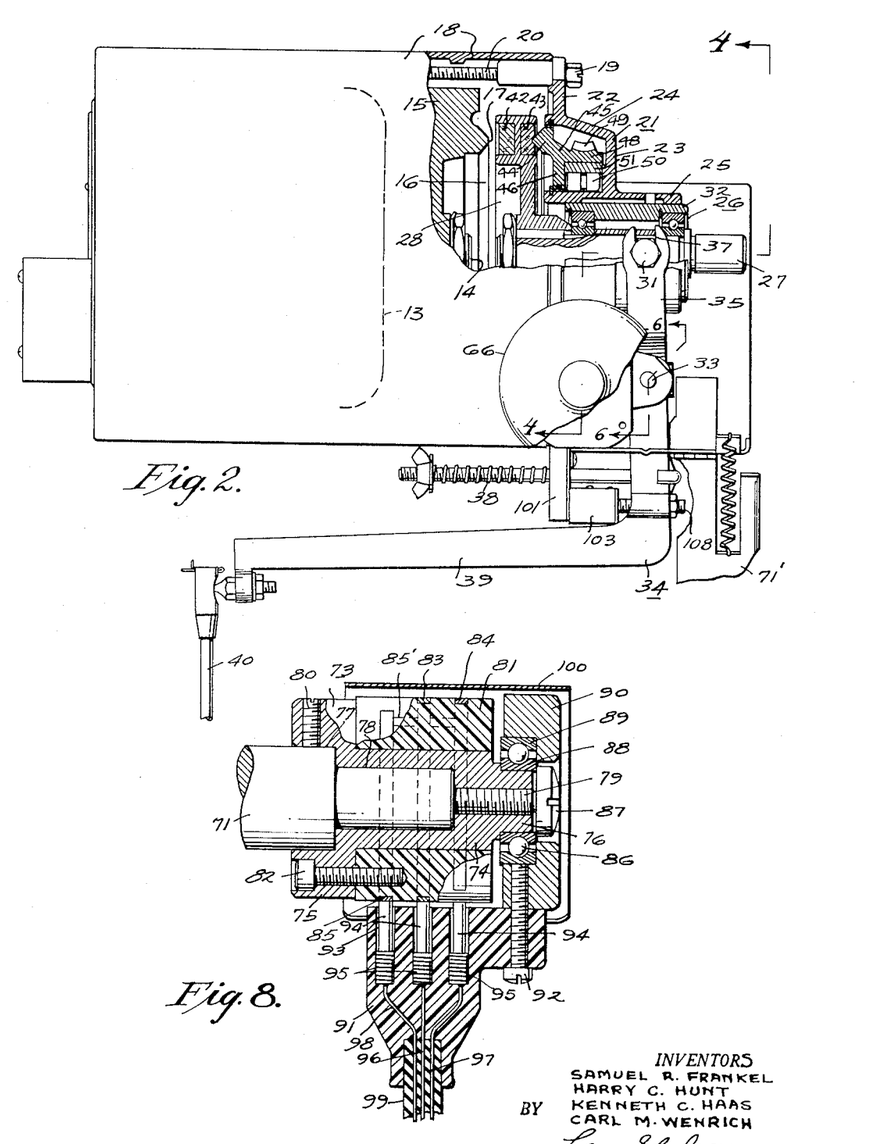
Figure 2 is an enlarged front elevation of the power transmitting mechanism with parts broken away, sectioned or omitted for the sake of clarity.
Figure 8 is an enlarged vertical section on line 8—8 of Figure 1.

Pivotally secured to the end member 21, as at 33, is a clutch-actuating lever 34, this lever being provided at its upper end with a yoke portion 35 that has laterally spaced arms 36—36 which embrace the journal box 25. The arms 36—36 are each provided with a slotted terminal end 37 for engagement with a stud 31 that projects outwardly through an opening 30 in the side wall of the journal box 25. The lever 34 is under the influence of a compression spring 38 which normally holds the lever in its position as shown in Figure 2, in which position the clutch disc 28 is disengaged from the flywheel of the motor 13. The lower arm of the pivoted lever designated 39 is suitably connected, as by a link 40, to a foot treadle 41 for actuation of the lever, it being noted that a downward pull upon the link 40 shifts the yoke portion 35 of the lever toward the motor 13 and so causes the clutch disc 28 to engage the motor flywheel 15.

As most clearly appears in Figure 2, the clutch disc 28 is provided adjacent its peripheral edge with a pair of oppositely facing annular friction discs 42 and 43 of cork or other suitable resilient material, these discs being adapted for engagement respectively with the annular rib 16 of the flywheel 15 and an annular rib 44 formed upon a revoluble member designated generally by the numeral 45, now to be described.

This member 45 comprises a centrally apertured web portion 46 fitted loosely over the inner end portion of the journal box 25, an inner rim portion 47 that carries the annular rib 44 and an outer rim portion 48 that has formed thereon worm engaging teeth 49. Between the web 46 of the revoluble member 45 and the central wall part 23 of the end member 21 and surrounding the journal box 25 is a roller-bearing assembly 50. The external sleeve of this assembly, designated 51, is fitted within the outer rim portion 48 of the revoluble member 45 and carries the revoluble member 45 for rotation about the journal box 25. It will be understood that the annular rib 44 is similar to the annular rib 16 in that it presents axially, albeit in the opposite direction, and is of generally triangular shape in transverse cross section to provide it with a relatively sharp outer edge 52. The revoluble member 45 is a component part of a brake and auxiliary drive assembly, presently to be described.

Extending horizontally along the bottom portion of the end member 21 immediately beneath and in substantial tangential relation to the annular central part 24 thereof is a tubular part 53 formed as an integral extension of the end member 21. The interior of the tubular part 53 communicates with the annular space extending about the inner end portion of the journal box 25, the opening through which communication is effected being designated 54. Within the tubular part 53 is a worm shaft 55 having an intermediate worm portion 55ª which underlies and meshes with the teeth 49 on the rim of the revoluble member 45. One end portion of the worm shaft 55 is journalled in a bushing 56 suitably carried by the end member 21, while the opposite portion of the shaft is journalled in a bushing assembly comprising a pair of axially spaced bushings 57—57 suitably fitted into the opposite ends of a supporting sleeve 58, the latter being externally circumferentially grooved, as at 59, for receiving the end of a set screw 60, which is threaded through the wall of the tubular part 53 and which serves to secure the bushing assembly and consequently the worm shaft 55 against any material axial displacement.

A reduced diameter end portion 61 of the worm shaft 55 carries one end of a flexible coupling designated generally by the numeral 62. The coupling 62 which is preferably formed of a suitable flexible material, for example, neoprene, is suitably fitted with a pair of metal end bushings 63—63, one of which bushings is received by the reduced diameter end portion 61, being secured thereto by a set screw 64. The other bushing 63 is received by and similarly set-screwed to a shaft 65 which is axially alined with the worm shaft 55. The shaft 65 is a component part of an auxiliary direct current series wound motor 66 that is suitably secured to the outer end of the tubular part 53 through the medium of an external flange 67 which is formed integral with the part 53. As shown diagrammatically in Figure 10, this motor 66 includes an armature coil 66ª connected in series with a field coil 66ᵇ.

Figure 5:
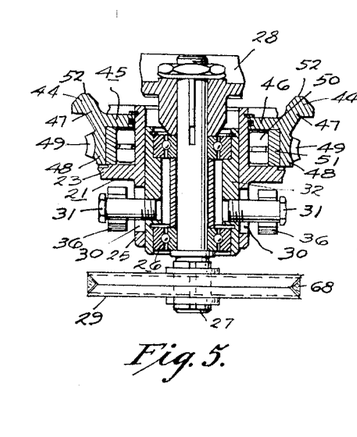
Figure 5 is a horizontal section on line 5—5 of Figure 3.
Figure 6:
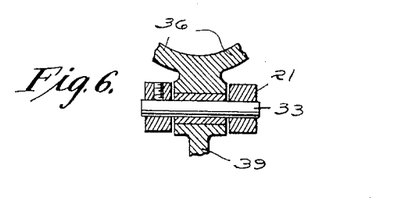
Figure 6 is a vertical section on line 6—6 of Figure 2.

As most clearly appears in Figures 1 and 5, trained over the belt pulley 29 is a drive belt 68, which extends upwardly through a suitable opening 69 in the table top 11, being then trained over a belt pulley 70 mounted on the sewing machine spindle, designated 71. Associated with the belt pulley 29 and the drive belt 68 is a guard, designated 71'. Additionally mounted on the freely extending end of the spindle 71 of the sewing machine or other work utility is a synchronizer 72, now to be described.

This synchronizer 72, as most clearly appears in Figure 8, comprises a metal core 73 in the form of a cylindrical main body 74 which terminates at opposite ends respectively in an external flange 75 and a reduced diameter portion 76. The flanged end of the core 73 is provided with a central bore portion 77 that communicates with a reduced diameter bore portion 78 which in turn communicates with an internally threaded bore portion 79 still further reduced in diameter and extended through the reduced diameter portion 76 of the core 73. The flanged end of the core 73 is fitted over the complementally shaped end of the sewing machine spindle 71, being secured thereto by a set screw 80.

Embracing the main body 74 of the core 73 is a cylindrical sleeve 81 made of insulating material, this sleeve being secured against displacement by set screws 82 and being of such a length that the reduced diameter portion 76 of the core 73 extends axially beyond the sleeve. Embedded in axially spaced external portions of the sleeve 81 are three electrical conductor rings 83, 84 and 85, the ring 83 being in the form of a continuous ring and the rings 84 and 85 being in the form of split rings, these splits being disposed at diametrically opposed sides of the sleeve 81. The rings 83, 84 and 85 are suitably electrically interconnected, as by bus bar means 85'.

The reduced diameter portion 76 of the core 73 is fitted with a ball-bearing unit 86 that is secured in position by a screw 87 threaded into the bore 79 so that the head thereof abuts the inner race 88 of the ball-bearing unit. It will be observed that the metal core 73, insulating sleeve 81, conductor rings 83, 84 and 85, bus bar 85' and race 88 of the ball-bearing unit rotate as a unit with the sewing machine spindle 71.

Pressed or otherwise nonrotatably fitted upon the outer race 89 of the ball-bearing unit 86 is an annular metallic member 90 against the underside of which is seated a brush supporting member 91 made of insulating material, the member 91 being secured by the screw 92 to the member 90 which in turn is press-fitted upon the outer race 89 of the ball-bearing unit. The main body of the brush mounting is provided with suitably spaced brush-receiving sockets 93 for respective alinement with the conductor rings 83, 84 and 85. Disposed within the sockets 93 are contact brushes 94 seated upon coil springs 95 and biased thereby against the conductor rings. The coil springs are connected respectively to a set of conductor wires, designated 96, 97 and 98, that lead therefrom through a common covering 99 of suitable material. Siutably secured to the brush housing member 91 and extending around the sleeve 81, the rings 83, 84, and 85 and the bus bar 85' is a shield 100. It will be observed that the race 89 of the ball-bearing unit and the annular member 90, the brush housing member 91 and the shield 100 form a stationary, nonrotating unit.

Figure 7:
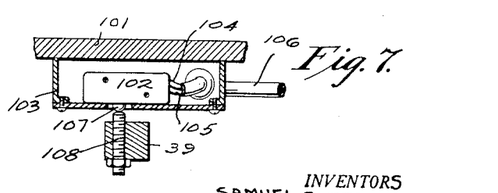
Figure 7 is a horizontal section on line 7—7 of Figure 3.
Figure 10:
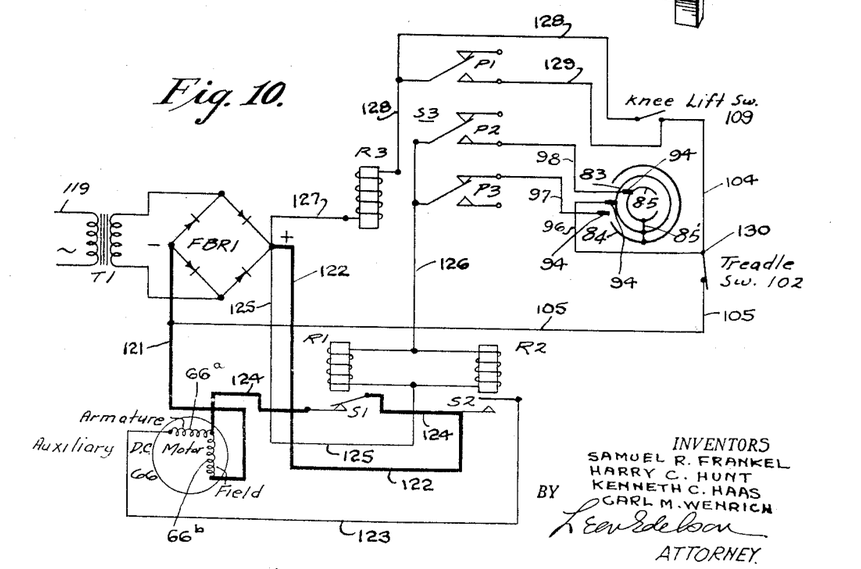
Figure 10 is a wiring diagram showing the electric circuit for the auxiliary means, the condition illustrated being that of the machine when at rest, as in Figure 1.

Referring particularly to Figures 2, 3 and 7, secured to the back of a depending extension 101 of the end plate 21 is a treadle switch 102 that is mounted within a housing 103. This switch 102 is connected by a pair of conductor wires 104 and 105 suitably sheathed in a covering 106 into the circuit as shown in Figure 10. The switch 102 is provided with a push button 107 that extends through a wall of the housing 103 and registers with an adjustable actuator element 108 which is threaded through a lateral extension of the lower arm 39 of the lever 34. In the illustrated condition of the machine, the push button 107 is only partially depressed and the switch 102 is closed. The push button 107 automatically moves from its partially depressed to its fully depressed position as the throw of the lever 34 increases due to wear in the clutch assembly, the arrangement being such that the switch will open when the treadle 41 is depressed sufficiently to position the clutch disc 28 intermediate its clutching and braking positions.

Figure 9:
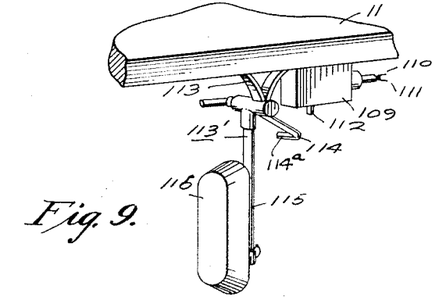
Figure 9 is a perspective view of switch means for controlling the needle positioning mechanism.

Referring particularly to Figures 1 and 9, secured to the underside of the table top 11 is a knee lift switch assembly 109. This switch is connected into the circuit by a pair of conductor wires 110 and 111 and is provided with a downwardly presenting push button 112 for actuation of the switch. Likewise secured to the underside of the table top 11 is a bracket 113 that carries an actuating lever for the knee lift switch, designated generally by the numeral 113', mounted for pivotal movement. The lever 113' is provided with a pair of angularly related arms 114 and 115, the former being provided with a terminal portion 114a that registers with the push button 112 and is normally disposed in lower spaced relation thereto, and the latter being fitted with a knee pad 116. In the illustrated at rest condition of the machine, the knee lift switch is open. When, however, the lever 113' is swung about its pivotal axis to a position wherein the terminal portion of the arm 114 operatively depresses the push button 112, the switch 109 is closed. Immediately upon release of the lever 113', it returns to its initial position by reason of its own weight and so re-opens the switch 109. It will be understood that while the terminal portion of the arm 114 is swinging into contact with the push button 112, the presser foot of the stitch forming mechanism, designated 117, is raised by means (not shown) associated with the lever 113'.

As shown in Figure 1, under the table top 11 is a housing 118 within which is suitably mounted a pair of relays R1 and R2, which respectively control a pair of single pole, single throw switches S1 and S2 (see Figure 10). When the relays R1 and R2 are not energized, the switch S1 is closed and the switch S2 is open, and conversely, when these relays are energized the switch S1 is open and the switch S2 is closed. When the relays are de-energized after having been energized, the switch S1 closes immediately, while the switch S2 snaps open after a time delay in the order of the tenths of a second.

Likewise, suitably mounted within the housing 118 is a relay R3 (see Figure 10) that controls a three pole, double throw switch S3 having three switch sections designated respectively P1, P2 and P3. When the relay R3 is not energized, as when the machine is in its at rest condition, the switch sections P1 and P2 are open, while the switch section P3 is closed, as shown in Figure 10, while when the relay R3 is energized, the switch sections P1 and P2 are closed while the switch section P3 is open.

Referring now more particularly to Figure 10, which illustrates diagrammatically the electrical circuit and relative conditions of the synchronizer, the relays and their associated switches and the auxiliary motor after the main switch is closed for operation of the principal motor 13 but before any sewing operation is inaugurated by actuation of the foot treadle 41, it will be understood that the motor 13 (not shown in Figure 10) is supplied with alternating current of the requisite voltage through an alternating current supply circuit which may be independent of or which may be part of the circuit designated 119 for supplying alternating current to the transformer T1 shown in Figure 10. Thus, the current supply for the auxiliary motor 66 may be derived from the main motor supply or independently thereof. As shown in Figure 10, the direct current supply for the auxiliary motor 66 is obtained through a circuit which is inductively coupled to the alternating current supply circuit 119 by the transformer T1 to the secondary winding of which is connected a full wave bridge rectifier FBR1 for converting the alternating current supply to direct current requisite for operation of the auxiliary motor 66. The negative terminal of this rectifier is connected by the conductor 121 to the series field winding of the motor, while the positive terminal of the rectifier is connected to the armature winding through the conductors 122 and 123 interconnected by the switch S2. The field winding of the motor is additionally connected across the terminals of the rectifier by the conductor 121 and a conductor 124, which extends from the junction point of the field winding and the armature winding to the conductor 122, the conductor 124 including therein the switch S1.

The relays R1 and R2, which respectively control operation of the switches S1 and S2 are commonly connected at corresponding ends thereof to the plus terminal of the rectifier by the conductor 125, while their opposite ends are commonly connected by the conductor 126 to the switch sections P2 and P3 of the switch S3 controlled by the relay R3. One terminal of this relay R3 is connected by conductor 127 to the plus terminal of the rectifier, while the opposite terminal of said relay is connected by conductor 128 to one terminal of the knee lift switch 109. Connected in parallel with said knee lift switch is the switch section P1 of the switch S3. It will be noted that the switch section P1 is included in a conductor 129 which connects the switch terminals to the conductors 128 and 104 respectively. The conductor 104, as above described, interconnects one terminal of the treadle switch 102 with one terminal of the knee lift switch 109, said conductor 104 being also connected, as at 130, to the conductor 96 leading to the brush 94 in contact with the central ring 83 of the synchronizer. The remaining two rings 84 and 85 of the synchronizer are respectively connected by the conductors 97 and 98 to the fixed terminals of the switch sections P3 and P2 of the switch S3. The terminal 130 of the treadle switch 102 is connected by the conductor 105, as hereinbefore described, to the conductor 121 leading to the negative terminal of the rectifier.

When it is desired to operate the machine, the main motor starting switch S4 (see Figure 1) is closed, whereupon alternating current of the requisite voltage is supplied to the circuit to effect operation of the motor 13. When this motor is thus in operation, upon then depressing the foot treadle 41, the link 40 is drawn downwardly and the lever 34 is pivoted about the pin 33 against the action of the compression spring 38 so as to shift its yoke portion 35 toward the motor 13 and the disc 28 into clutching engagement with the motor flywheel 15. Thus rotation of the motor flywheel 15 is translated into rotation of the assembly comprising the disc 28, shaft 27 and belt pulley 29, and rotation of this assembly is translated by the belt 68 trained over the pulleys 29 and 70, into rotation of the pulley 70 and the sewing machine spindle 71. Rotation of the latter is translated in turn into operation of the stitching mechanism in a well known manner. To terminate operation of the stitching mechanism, the treadle 41 is released or heeled, whereupon the compression spring 38 acts to pivot the lever 34 about the pin 33 so as to lift the link 40 and the treadle 41, and so as to shift the yoke portion 35 away from the motor 13 and the disc 28 into engagement with the revoluble braking member 45. When the worm 55a is not rotating, by virtue of its engagement with the teeth 49 on the rim of the member 45, the latter is effectively held against rotation and is operative as a brake for the disc 28 and the members operatively interposed between the latter and the stitch forming mechanism. Intermittent operation of the stitch forming mechanism is effected by alternately toeing and heeling the treadle 41.

Referring particularly to Figures 1, 8 and 10, when the stitch forming mechanism is idle, the treadle switch 102 is closed, the knee lift switch is open, the relays R1, R2 and R3 are not energized, the switch S1 is closed, the switch S2 is open, the switches P1 and P2 are open, the switch P3 is closed, and the brush 94 operatively associated with the conductor ring 84 of the synchronizer 72 is in registry with the gap in said ring. In this condition of the machine, the auxiliary motor 66 is idle because current is cut off from its armature, and normally the vertically reciprocable needle of the sewing machine, designated 120, is in lowered position. When, however, the stitch-forming mechanism is in operation, the treadle and knee lift switches are both open, while the relays R1, R2 and R3 remain not energized. In this condition of the machine, while the spindle 71 of the sewing machine rotates, in consequence of which the brushes 94—94 associated respectively with the conductor rings 84 and 85 of the synchronizer 72 alternately register with the gaps in these rings, the auxiliary motor 66 still remains idle because the condition of the switches S1, S2, P1, P2 and P3 remains as above described to cut off the supply of operating current to the armature winding of the motor 66.

When the treadle 41 is released to terminate a sewing operation, thereby rendering idle the stitch-forming mechanism, the treadle switch 102 automatically closes and the knee lift switch remains open. Should it happen that the needle comes to rest in its lowered position, the relays R1, R2 and R3 remain not energized and the brush 94 associated with the ring 84 of the synchronizer 72 registers with the gap or split in said ring, in consequence of which the auxiliary motor 66 remains idle because current is cut off from its armature. However, when the needle comes to rest in a raised position, the brush 94 associated with the conductor ring 84 does not register with the gap or split in this ring, in consequence of which relays R1 and R2 are simultaneously energized to thereby open switch S1 and close switch S2. Thus, current is supplied to the auxiliary motor 66 for operation thereof and rotation of the motor shaft 65, flexible coupling 62 and the worm shaft 55 as a unit. Inasmuch as the worm 55$^a$ is operatively engaged with the teeth 49 on the rim of the revoluble member 45, upon such rotation of the worm 55$^a$ the revoluble member 45 is correspondingly rotated and thus is operative to actuate the disc 28 and the members operatively interposed between the latter and the stitch forming mechanism. If the treadle switch 102 closes while the needle is moving downward, the needle continues to move downward to its lowered position, and if the treadle switch 102 closes while the needle is rising, the needle completes its upward movement and then moves downward to its lowered position. Movement of the needle is abruptly terminated when the needle first reaches its lowered position, in the manner now to be described.

When the needle reaches its lowered position, the brush 94 associated with the conductor ring 84 registers with the gap or split in the ring, in consequence of which relays R1 and R2 are de-energized, whereupon the switch S1 closes instantly and the switch S2, after a slight delay, opens. During the slight delay aforesaid both switches S1—S2 are closed, in consequence of which the power to the auxiliary motor 66 is shorted and the auxiliary motor is thereby dynamically braked, whereupon operation of the auxiliary motor and, consequently, of the stitch-forming mechanism is abruptly terminated. The short circuit endures only for a fraction of a second, a length of time insufficient for causing damage to the auxiliary motor. When the switch S2 does open, the circuit returns to its original condition, ready operation can be repeated. The delay relay R2, therefore, may be regarded as an automatic recycling device.

When it is desired to raise the needle after the machine has come to rest with the needle in its lowered position, the operator strikes the knee pad 116 to swing the knee lift lever 113' about its pivotal axis so that the end of its arm 114 depresses the push button 112, whereupon the knee lift switch is closed. The instant the latter occurs, the relay R3 is energized, in consequence of which the switch sections P1 and P2 of the switch S3 close and the switch section P3 of the switch S3 opens. It will be observed that the knee lift lever 113' may be released immediately without de-energizing the relay R3 since current will by-pass the knee lift switch through the switch section P1 of the switch S3. Of course, the conductor ring 85 and the associated brush 94 are in contact, and with the relay R3 energized and the switch S3 in the condition just described, the relays R1 and R2 will have been energized, in consequence of which the switch S1 is open and the switch S2 is closed. Thus, current is supplied to the auxiliary motor 66 for operation thereof and, consequently, for movement of the needle upwardly. When the needle reaches its raised position, the brush 94 associated with the conductor ring 85 registers with the gap or split in the ring, in consequence of which relays R1 and R2 are deenergized, whereupon the armature winding 66$^a$ of the auxiliary motor is shorted and dynamic braking is effected in the same manner as described hereinbefore.

When it is desired to lower the needle again after having raised it in the manner just described, the operator momentarily depresses the treadle 41 an amount sufficient for opening the treadle switch 102 but not sufficient for shifting the disc 28 into clutching engagement with the motor flywheel 15. This de-energizes the relay R3 (which remained energized after the needle reached its raised position), in consequence of which the switch sections P1 and P2 of the switch S3 open and the switch section P3 of the switch S3 closes. Of course, the conductor ring 84 and its associated brush 94 are in contact, and with the relay R3 de-energized and the switch S3 in the condition just described, the relays R1 and R2 will have been energized, in consequence of which the switch S1 is open and the switch S2 is closed. Thus, current is supplied to the auxiliary motor 66 for operation thereof, and, consequently, for movement of the needle downwardly. When the needle reaches its lowered position, the brush 94 associated with the conductor ring 84 registers with the gap or split in the ring, in consequence of which the relays R1 and R2 are de-energized, whereupon the armature winding 66$^a$ of the auxiliary motor is shorted and again dynamic braking is effected in the same manner as described hereinafter.

In the operation of the sewing machine, the needle reciprocates vertically continuously so long as the operator toes the foot treadle 41. When the foot treadle is heeled or released, the needle automatically comes to rest in its down position, convenient for turning the work about the needle. When the lever 113' for operating the knee lift switch is actuated, the needle moves upwardly to its raised position, convenient for removing work from the machine, there being no need for pressure continuously applied to the lever 113'. When the foot treadle 41 is partially depressed momentarily the needle moves downwardly to its lowered position. By alternately actuating the lever 113' for the knee lift switch to raise the needle and the foot treadle 41 to lower the needle, single stitching may be effected. The operator's hands, it will be noted, are free at all times for handling the work, and only simple movements of the operator's leg are required to operate the machine, i.e., movements that are conventional to operate the machine, i.e., movements that are conventional in present day machine operation.

It will be understood that the synchronizer 72 may be oriented on the sewing machine spindle 71 so that the needle will normally come to rest in any predetermined position. For example, by turning the synchronizer 180° about the spindle 71, the arrangement becomes such that the needle will normally come to rest in the raised, instead of the lowered, position thereof.

The above described operation of the machine is further illustrated in Figures 10 to 16, inclusive, which diagrammatically show the circuit conditions which prevail under the varying conditions of the machine while it is at rest and when it is in operation. In all of these diagrammatic figures, the portions of the circuit through which current is effectively flowing to and from its source of supply, as from the rectifier FBR1 or from an independent supply of direct current, are shown in heavy lines.

Thus, referring to Figure 10, which shows the circuit conditions prevailing when the main motor starting switch S4 is closed to start the main motor 13 but before the treadle 41 is depressed to initiate operation of the sewing machine, it will be observed that direct current from the rectifier is delivered only to and through the series field winding 66$^b$ of the auxiliary motor, and thus the latter remains inoperative. The synchronizer is, of course, at rest in a position interrupting flow of current to any of the relays R1, R2 and R3 and, consequently, these relays are not energized and the switches S1, S2 and S3 are in their respective conditions as shown. In the condition of the apparatus as represented by the circuit diagram of Figure 1, the needle of the sewing machine is in its downmost position.

Figure 11:
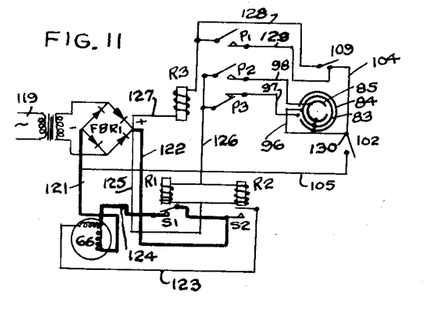
Figures 11 to 16, inclusive, are similar wiring diagrams further illustrating operation of the machine.

Figure 11 illustrates the circuit condition which prevails when the treadle 41 is depressed by the toe of the operator to place the sewing machine in full operation, the main motor being then clutched to the disc 28 for driving connection with the sewing machine through the drive belt 68 as hereinbefore described. It will be noted that for this normal operation of the sewing machine, the synchronizer will rotate with the spindle of the sewing machine, but due to the now open condition of the treadle switch 102, the relays R1, R2 and R3 remain not energized and the switches S1, S2 and S3, accordingly, remain set, as in Figure 10, to restrict the current flow from the rectifier to and through only the series field winding 66$^b$ of the motor 66. Thus, the latter remains inoperative.

Figure 12:
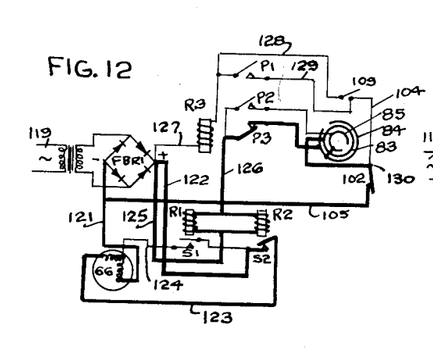

Figure 12 illustrates the circuit condition prevailing when the sewing operation is terminated, as by releasing the foot treadle 41 so that it may assume its at rest position, thereby closing the treadle switch 102, it being assumed that the sewing machine 10 at the instant of release of the treadle and closing of the treadle switch is at some position other than its downmost position. Under such prevailing conditions, current may flow as indicated through the synchronizer, i.e., from the ring 83 thereof to the ring 84, to effect energization of the relays R1 and R2 and thereby reverse the status of the switches S1 and S2, the switch S1 being now open and the switch S2 closed. With switches S1 and S2 respectively opened and closed, as shown in Figure 12, current from the rectifier is supplied to the series connected field winding and armature winding of the motor 66, in consequence of which the latter is now operative to effect rotation of the revoluble brake disk 45 through the worm and worm gear drive previously described.

Figure 13:
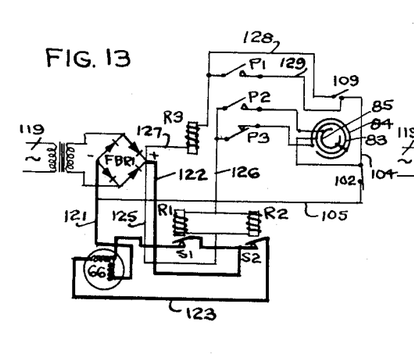

Figure 13 illustrates the circuit condition prevailing at the instant when the needle is brought to its downmost position by operation of the auxiliary motor immediately following release of the foot treadle as described in connection with Figure 12. At the instant when the needle reaches its said downmost position, the synchronizer will have been rotated into a corresponding position to effect bridging only of its rings 83 and 85, the ring 84 being then electrically disconnected from its contact brush 94, at which instant the relays R1 and R2 becomes de-energized and the switches S1, S2 are respectively closed and opened. However, the fast-acting relay R1 causes the switch S1 to close in advance of the switch S2 operating under influence of the delay relay R2 and, accordingly, there is a time interval of about 0.2 second during which both switches are closed, as shown in Figure 13. During this interval when both switches S1 and S2 are closed, current is supplied from the rectifier not only to the armature and field windings in series, but also to the field winding alone, with the result that the current bypasses the armature winding with resultant interruption in operation or dynamic braking of the motor 66. This dynamic braking of the auxiliary motor occurs only during the extremely short interval of time that both switches S1 and S2 are closed. When the switch S2 thereafter opens, the current supply circuit to the motor is as shown in Figure 10, there being then no current passing through the armature winding for operation of the motor so that the latter remains inoperative following dynamic braking thereof.

Figure 14:
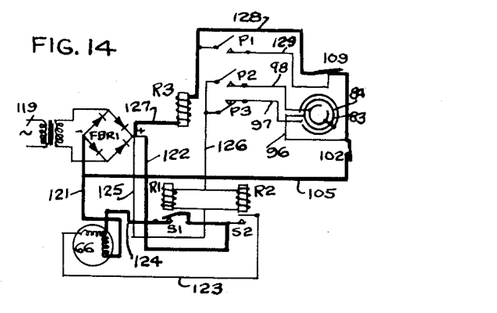

Figure 14 shows the circuit conditions which prevail when the knee lift switch 109 is closed in the manner and for the purpose hereinbefore described. It will be observed that when this knee lift switch 109 is closed (the treadle switch 102 being also closed) current is supplied to the relay R3 to energize the same. This energization of the relay R3 is effected instantly that the knee lift switch is closed and while the synchronizer is rotating with the sewing machine needle actuating spindle. Upon such energization of relay R3, the switch S3 is simultaneously actuated to close the normally open switch section P1 and to open the normally closed switch sections P2 and P3 (as see Figure 15).

Figure 15:
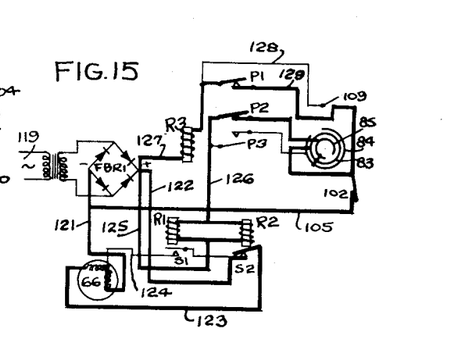

Upon subsequent release of the knee lift switch, as shown in Figure 15, during upward movement of the sewing machine needle and corresponding rotation of the synchronizer, energizing current for the relay R3 will continue to flow through the closed switch section P1 and thus said relay will continue to hold the switch section P2 closed and the switch section P3 open. At the same time the synchronizer will have been rotated in correspondence with upward movement of the sewing machine to present all of its interconnected rings 83, 84 and 85 in position to be simultaneously engaged by the several contact brushes 94, as a result of which current flows from the rectifier to and across the rings 83 and 85 and through the closed switch section P2 of the switch S3 to the relays R1 and R2 to thereby energize the latter and establish through the switch S2 closed upon energization of relay R2, an operating circuit for the motor 66, this operating circuit being the same as shown in Figure 12. The motor 66 will thereupon be operative to drive the sewing machine through the revoluble brake member 45 and its associated worm and worm gear drive hereinbefore described.

Figure 16:
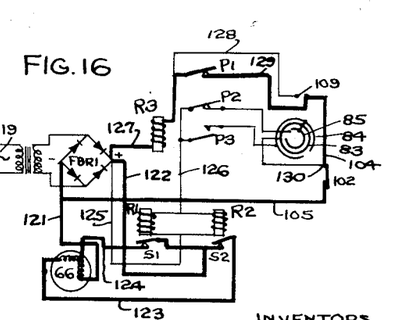

Figure 16 illustrates the conditions prevailing when the needle of the sewing machine assumes its uppermost position, into which position it may be advanced by operation of the knee lift switch 109. As the needle moves upwardly from an intermediate position (as assumed in Figure 15) to its final uppermost position, the motor 66, operating under the conditions as described in connection with Figure 15, continues to drive the sewing machine and the synchronizer until the latter assumes a position corresponding to the uppermost position of the needle. In this position of the synchronizer only the rings 83 and 84 thereof are bridged, as shown in Figure 16, but due to the fact that switch section P3 is held open by the still energized relay R3, current flow to the relays R1 and R2 is interrupted and said relays are thereupon de-energized. The switches S1 and S2 are thereby actuated, as described in connection with Figure 13, to effect dynamic braking of the motor 66 at the instant when the needle is at its uppermost position. When the switch S2 thereafter opens upon the delayed de-energization of the relay R2, the current supply circuit to the motor 66 is interrupted, as shown in Figure 10, this motor being thereby rendered inoperative.

For single stitch operation of the machine, as hereinbefore described, the circuit conditions are as illustrated in Figures 11, 12 and 13 for each downward stroke of the needle, and as illustrated in Figures 14, 15 and 16 for each upward stroke of the needle. Thus, upon momentarily depressing the treadle 41 partially through an arc of about 10 degrees, the treadle switch 102 first opens as shown in Figure 11 and then closes as shown in Figures 12 and 13 to effect movement of the needle downwardly and to stop it at the bottom of its downward stroke. Similarly, upon striking the knee lift switch actuating lever to momentarily close and then open the switch 109, the effective circuits shown in Figures 14, 15 and 16 will be sequentially established to effect upward movement of the needle and stopping of the needle at the upper end of its stroke. Obviously, by alternately partially depressing the foot treadle 41 and actuating the knee lift switch lever 113', controlled single stroke reciprocation of the needle may be obtained.

Of course, the present invention as hereinbefore described and as shown in the accompanying drawings is susceptible of various changes and modifications which may be made from time to time without departing from the general principles or real spirit of the invention, and accordingly, it is intended to claim the same broadly, as well as specifically, as indicated by the appended claims.

What is claimed as new and useful is:

1. In combination with a sewing machine stitch forming mechanism having a reciprocable needle, a driving clutch element, a brake member, a driven clutch element coupled to the stitch forming mechanism and selectively shiftable between first and second positions to engage in said first position said driving clutch element for intermittently transmitting power to said stitch forming mechanism to thereby cause continuous reciprocation of said needle during normal periods of operation or to engage in said second position said brake member for stopping said needle and then moving said needle to a predetermined position, an auxiliary direct current electric motor having field and armature windings, means for driving said brake member by said auxiliary motor and thereby driving said stitch forming mechanism when said driven clutch element is in said second position, and means connected in electric circuit with said motor for cutting off the supply of current to said motor armature winding during normal operation, supplying current to said motor armature winding after normal operation and then cutting off the supply of current when said needle is in said predetermined position.

2. In combination with a sewing machine stitch forming mechanism having a reciprocable needle, a driving clutch element, a brake member, a driven clutch element coupled to the stitch forming mechanism and selectively shiftable between first and second positions to engage in said first position said driving clutch element for intermittently transmitting power to said stitch forming mechanism to thereby cause continuous reciprocation of said needle during normal periods of operation or to engage in said second position said brake member for stopping said needle and then moving said needle to a predetermined position, an auxiliary direct current electric motor having field and armature windings, means for driving said brake member by said auxiliary motor and thereby driving said stitch forming mechanism when said driven clutch element is in said second position, and means connected in electric circuit with said motor for cutting off the supply of current to said motor armature winding during normal operation supplying current to said motor armature winding after normal operation and then cutting off the supply of current when said needle is in said predetermined position, said last named means including a device automatically operative to signal the position of the needle to thereby synchronize operation of the auxiliary motor with the movement of the needle and switch means responsive to a signal that the needle is in the predetermined position to short circuit the supply of current to said auxiliary motor armature winding to thereby dynamically brake the stitch forming mechanism.

3. The combination as defined in claim 1 wherein the means connected in electric circuit with the auxiliary motor includes a device automatically operative to signal different predetermined positions of the needle and thereby synchronize operation of said auxiliary motor with the position of said needle, a switch manually operable for initiating movement of said needle from one of said positions to the other, and switch means responsive to actuation of said manually operable switch to close for the supply of current to said auxiliary motor for operation thereof and movement of said needle to the latter of said positions.

4. The combination as defined in claim 1 wherein the means connected in electric circuit with the auxiliary motor includes a device automatically operative to signal extreme positions of the needle and thereby synchronize operation of said auxiliary motor with the position of said needle, a pair of switches each manually operable for initiating movement of said needle from one of said positions to the other, and switch means responsive to actuation of either of said pair of manually operable switches to close for the supply of current to said auxiliary motor for operation thereof and movement of said needle to the latter of said positions.

5. The combination as defined in claim 1 wherein the means connected in electric circuit with the auxiliary motor includes a device automatically operative to signal first and second positions of the needle and thereby synchronize operation of said auxiliary motor with the movement of said needle, first and second switches each manually operable, said first switch being operable for initiating movement of said needle from said first position to said second position and said second switch being operable for initiating movement of said needle from said second position to said first position, and third switch means responsive to actuation of either of said first or second manually operable switches to close for the supply of current to said auxiliary motor for operation thereof and movement of said needle from one to the other of said positions, and wherein there are provided controls operable by being actuated and then immediately released including a treadle operable by foot for shifting the driven clutch element and simultaneously automatically actuating said first switch while said driven clutch element is in an intermediate position between said driving clutch element and the brake member, and a lever operable by the knee of the operator for actuating said second switch.

6. In combination, first and second relatively movable members so related that particular positions of said first member always correspond to particular positions of said second member, means associated with one of said members for sensing at least one predetermined position thereof, first and second drive means for non-simultaneously driving one of said members, said first drive means being operable to produce continuous motion of said one member in response to the actuation of first control means, said second drive means including a direct current motor automatically activatable and operable in response to said sensing means to drive said member associated with said sensing means to the said sensable predetermined position, said motor being thereafter deactivated and dynamically braked to a stop substantially instantaneously by short-circuiting the armature winding under the control of said sensing means.

7. The combination according to claim 6 further including second control means actuatable by said first control means, said second control means when actuated rendering said sensing means inoperative and when deactuated rendering said sensing means operative.

8. The combination according to claim 6, wherein said second drive means includes speed-reducing means interposed said motor and said driven member, whereby said second drive means drives said driven member at a speed less than that produced by said first drive means.

9. The combination according to claim 6 wherein said sensing means is provided with plural means for sensing a plurality of different predetermined positions of the said member associated therewith, and third control means coupled to said sensing means for rendering the activation and deactivation of said direct current motor responsive to a selected one of said plural means.

10. The combination according to claim 7 wherein said first and second members are respectively the revoluble spindle and the reciprocable needle-holding shaft of a sewing machine, said sensing means is an electromechanical synchronizer comprising a fixed brush-holding housing and a revoluble spindle for rotation therewithin including a closed conductive ring and a split conductive ring each in engagement with a different brush enclosed in said housing, said first drive means includes a continuously running main motor and a clutch assembly coupled to said sewing machine revoluble spindle, said first control means includes a treadle coupled to said clutch assembly by a mechanical linkage and operable to engage and disengage said clutch and said main motor, said second control means includes a switch in a series electric circuit with said synchronizer, said switch being opened by operation of said treadle whenever the latter causes said clutch assembly to engage said main motor for driving said sewing machine spindle and thereby disabling said synchronizer.

11. In combination first and second relatively movable members so related that particular positions of said first member always correspond to particular positions of said second member, means associated with said first member for sensing at least one predetermined position thereof, drive means for driving said first member including a direct current motor and motor energizing means, said motor energizing means being automatically activatable by said sensing means to cause said motor to drive said first member to the said sensable predetermined position whenever the sensed position of said first member is different from said predetermined position, said motor being thereafter dynamically braked to a stop substantially instantaneously by short-circuiting the motor armature winding under the control of said sensing means, and control means for selectively disabling said sensing means and thereby preventing the automatic activation of said motor energizing means.

12. The combination according to claim 11 wherein said motor energizing means comprises a direct current source for energizing both the field winding and armature winding of the said motor, and additional control means responsive to said sensing means for controlling the transfer of current from said current source to said motor windings.

13. The combination according to claim 11 wherein said sensing means associated with said first member is adapted to sense a plurality of different predetermined positions thereof, and auxiliary means for selectively enabling said sensing means to sense particular ones of said predetermined positions when said sensing means is not disabled by said control means.

References Cited in the file of this patent
UNITED STATES PATENTS

| | | |
|---|---|---|
| Re. 15,125 | Lindquist et al. | June 14, 1921 |
| 2,364,603 | Coxon et al. | Dec. 12, 1944 |
| 2,517,567 | Hill et al. | Aug. 8, 1950 |
| 2,622,230 | Mason | Dec. 16, 1952 |
| 2,708,415 | White | May 17, 1955 |
| 2,747,715 | Brinkman et al. | May 29, 1956 |
| 2,853,967 | Schwab | Sept. 30, 1958 |
| 2,876,407 | Winz | Mar. 3, 1959 |

FOREIGN PATENTS

| | | |
|---|---|---|
| 501,285 | Belgium | Feb. 28, 1951 |
| 509,072 | Belgium | Feb. 29, 1952 |
| 155,428 | Australia | Feb. 25, 1954 |
| 910,023 | Germany | Apr. 26, 1954 |
| 1,074,064 | France | Mar. 31, 1954 |